US011244342B1

(12) United States Patent
Chang et al.

(10) Patent No.: US 11,244,342 B1
(45) Date of Patent: Feb. 8, 2022

(54) SYSTEMS AND METHODS FOR REWARDS ENGAGEMENT SCORE

(71) Applicant: Wells Fargo Bank, N.A., San Francisco, CA (US)

(72) Inventors: Laura Chang, Wilmington, DE (US); Megan A. DesPlanques, San Francisco, CA (US); Richard Eiel, San Francisco, CA (US); Cem Isin, San Francisco, CA (US); Kim Löhrer, San Francisco, CA (US); Sarah W. Phelps, Annapolis, MD (US); Adeline Rassas, Maricopa, AZ (US)

(73) Assignee: Wells Fargo Bank, N.A., San Francisco, CA (US)

( * ) Notice: Subject to any disclaimer, the term of this patent is extended or adjusted under 35 U.S.C. 154(b) by 200 days.

(21) Appl. No.: 16/228,442

(22) Filed: Dec. 20, 2018

(51) Int. Cl.
*G06Q 30/02* (2012.01)
(52) U.S. Cl.
CPC ..... *G06Q 30/0233* (2013.01); *G06Q 30/0215* (2013.01); *G06Q 30/0224* (2013.01)
(58) Field of Classification Search
CPC ........... G06Q 30/0233; G06Q 30/0215; G06Q 30/0224
See application file for complete search history.

(56) References Cited

U.S. PATENT DOCUMENTS

| | | | |
|---|---|---|---|
| 7,025,674 B2 | 4/2006 | Adams et al. | |
| 7,856,377 B2 | 12/2010 | Cohagan et al. | |
| 8,732,073 B2 | 5/2014 | Thomas | |
| 8,825,523 B2 | 9/2014 | Gillenson et al. | |
| 9,595,043 B2 | 3/2017 | Roeding et al. | |
| 2010/0057553 A1 | 3/2010 | Ameiss et al. | |
| 2011/0014972 A1 | 1/2011 | Herrmann et al. | |
| 2011/0208585 A1 | 8/2011 | Daboll et al. | |
| 2011/0264501 A1* | 10/2011 | Clyne | G06Q 30/02 705/14.25 |
| 2014/0129314 A1 | 5/2014 | Kim | |
| 2014/0180811 A1 | 6/2014 | Boal | |
| 2014/0310080 A1 | 10/2014 | Salmon et al. | |
| 2014/0358655 A1 | 12/2014 | Wheeler | |
| 2015/0046241 A1 | 2/2015 | Salmon et al. | |

(Continued)

OTHER PUBLICATIONS

Sallam et al., "An Integrated Architecture for Notification System to Enhance the Efficiency of Mobile Marketplace" (published in 2011 International Conference on Business, Engineering and Industrial Applications, Jun. 2011, pp. 198-202) (Year: 2011).*

*Primary Examiner* — Abhishek Vyas
*Assistant Examiner* — Patrick Kim
(74) *Attorney, Agent, or Firm* — Foley & Lardner LLP

(57) ABSTRACT

Systems, methods, and apparatuses for encouraging engagement with a rewards system are described herein. A customer associated with a customer device holds a rewards account with a provider associated with a provider computing system. The provider computing system receives rewards and payment card activity of the customer, analyzes the rewards and payment card activity, and generates a rewards engagement rating, which the provider uses to generate and transmit tailored rewards engagement messages to the customer device. The messages provide rewards earn and burn opportunities in which the customer can select to participate.

23 Claims, 8 Drawing Sheets

(56) References Cited

U.S. PATENT DOCUMENTS

| | | |
|---|---|---|
| 2015/0095129 A1 | 4/2015 | Daigle |
| 2016/0239861 A1 | 8/2016 | Hage |
| 2016/0283973 A1* | 9/2016 | Corrie ................ G06Q 30/0226 |
| 2016/0314501 A1 | 10/2016 | Bartholomew et al. |
| 2017/0221156 A1 | 8/2017 | Mingarelli et al. |
| 2017/0278125 A1 | 9/2017 | Tietzen et al. |
| 2018/0075467 A1 | 3/2018 | Tiwari |
| 2018/0130092 A1 | 5/2018 | Nahass et al. |
| 2018/0158090 A1 | 6/2018 | Glynn et al. |
| 2018/0253767 A1 | 9/2018 | Rowley et al. |
| 2018/0268431 A1* | 9/2018 | Harris .................... G06N 3/084 |

\* cited by examiner

SYSTEMS AND METHODS FOR REWARDS ENGAGEMENT SCORE

TECHNICAL FIELD

Embodiments of the present disclosure relate to systems and methods for rewards engagement.

BACKGROUND

Many issuers of credit cards offer rewards points to customers. For example, some credit card issuers provide one reward point for every dollar spent on the credit card. Accordingly, as a customer continues to use a rewards credit card, the customer accumulates rewards points. The customer can then redeem the rewards points. Some customers may forget that the rewards points are available to them. Some customers may also not effectively use their payment cards to earn points up to their potential.

SUMMARY

A first example embodiment relates to a method of encouraging rewards activity. The method includes receiving, by a provider computing system associated with a provider, rewards activity information associated with a rewards account maintained by the provider and associated with the customer, receiving payment card information associated with the payment account, generating a rewards engagement score based on the rewards activity information and the payment card information, generating a rewards engagement message, and transmitting the rewards engagement message to a customer device associated with the customer.

Another example embodiment relates to a provider computing system associated with a provider. The provider computing system includes a network interface structured to facilitate data communication via a network, an accounts database structured to store information associated with a payment account associated with a customer, a rewards database structured to store information associated with a rewards account associated with the customer, and a processing circuit comprising a processor and memory. The processing circuit is structured to receive rewards activity information associated with the rewards account maintained by the provider and associated with the customer, receive payment card information associated with the payment account, generate a rewards engagement score based on the rewards activity information and the payment card information, generate a rewards engagement message based on the rewards engagement score, and transmit the rewards engagement message to a customer device associated with the customer.

Another example embodiment includes a customer device. The customer device includes a network circuit structured to communicate data to and from a provider computing system associated with a provider of a rewards account associated with the customer, an input/output device structured to exchange data with the customer, and a processing circuit comprising a processor and memory. The processing circuit is structured to receive, by the network circuit, a first graphical interface from the provider computing system, where the first graphical interface identifies one or more rewards account held by the customer at the provider and one or more rewards engagement messages generated by the provider computing system in response to customer engagement with the one or more rewards accounts, and where the first graphical interface further enables the customer to select the one or more rewards engagement messages. The processing circuit is further structured to receive a first input from the customer via the input/output device, the first input indicating a user selection of one of the one or more rewards engagement messages, and transmit, via the network circuit, the customer selection, to the provider computing system.

These and other features, together with the organization and manner of operation thereof, will become apparent from the following detailed description when taken in conjunction with the accompanying drawings.

DETAILED DESCRIPTION

Figure 1:
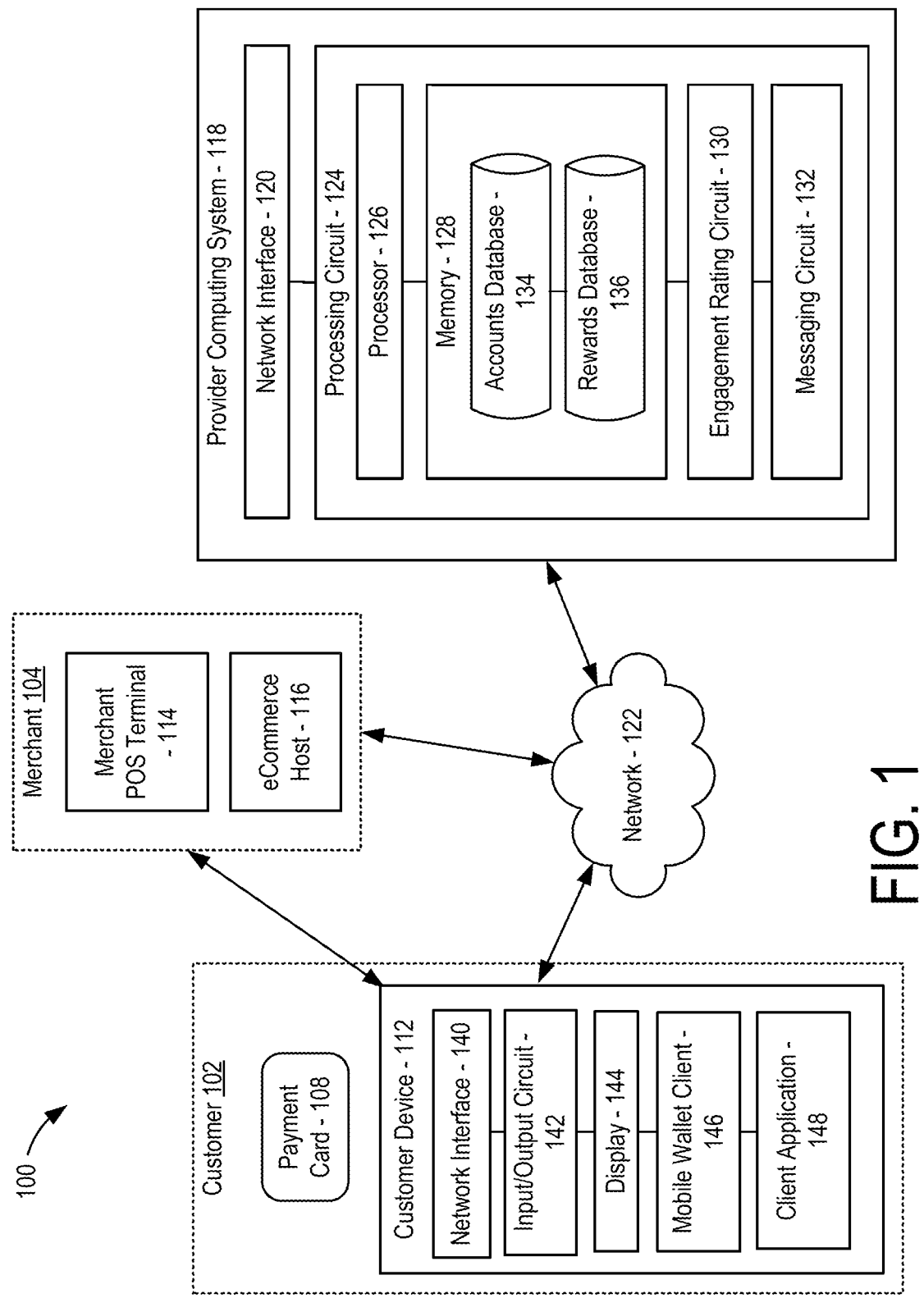
FIG. 1 is a view of a rewards engagement system according to an example embodiment.

Referring to the figures generally, systems, methods, and apparatuses for encouraging rewards system engagement are described herein. A customer of a provider having a rewards account may not be utilizing the rewards account to the full potential as determined by the provider of the rewards account. For example, the customer may not be effectively earning rewards points based on their transaction history (e.g., customer is using a debit card for purchases instead of a credit card). By analyzing the customer's transaction history, rewards points redemption history, the customer's rewards points preferences, etc., the provider identifies opportunities for the customer to earn or burn rewards points (e.g., redeem points, pay with points) and presents these opportunities to the customer in various forms.

To identify such opportunities, the provider generates a rewards engagement score for the customer, which is indicative of the customer's past engagement activities with the rewards system. The rewards engagement score is determined using the past earning activity and the past burning activity, such as paying with rewards points, redemption of rewards points, etc. As noted, using the rewards engagement score, the provider identifies opportunities for the customer to earn or burn rewards points and presents these opportunities to the customer in various forms. In some arrangements, the provider provides the opportunities in the form of an advertisement or banner presented on a website of the provider, an advertisement or banner on a client application of the customer device, a push notification to the customer device, etc. In some arrangements, the provider also determines one or more channels through which to present the opportunities (e.g., via a client application, via an online provider portal, etc.).

As used herein, "points" refers to rewards issued by a provider to a customer that can be redeemed through the provider and/or exchanged into currency by the provider at an exchange rate that is defined by the provider. As used herein, to "earn" or "earning" points refers to, but is not limited to, the act of receiving rewards points in exchange for a payment made by the customer using the payment card linked to the rewards account, signing up for a particular payment card, accepting promotional offers such as multiplied points, accepting offers from the provider to participate in certain programs provided by the provider, and the like. As used herein, to "burn" or "burning" points refers to, but is not limited to, using rewards points to make a purchase, redeeming rewards points for items or services, transferring rewards points to other customers, etc.

An example embodiment is described as follows. A customer holds a rewards account connected to a payment card (e.g., a credit card account, a debit card account) associated with a provider. The rewards account is structured such that the customer earns a rewards balance (e.g., rewards points, cashback rewards) in the customer's rewards account by using the payment account. For example, the customer earns one rewards point per dollar the customer spends using the payment account. In some cases, the customer may not be fully utilizing the rewards account such that they are not earning and using points in a way in which the rewards account is providing the optimal benefit to the customer.

The system described herein generates a customer-specific advertisement or banner based on the customer's rewards engagement score, which the system displays to the customer (e.g., as a rewards ad shown as part of a provider website, push notification to a customer device, as a notification on a client application, etc.). More specifically, if the system determines that the customer is either not earning or burning their rewards points in a manner which is optimally benefitting the customer and/or is relatively less than an average customer, the system generates and displays an ad or banner informing the customer of opportunities to earn or burn rewards points. The customer can click on the banner, and in response, the system redirects the customer to a screen relating to the rewards opportunity. For example, the screen shows the customer additional information about the ways in which the customer can burn rewards points, such as paying for a trip with rewards points, redeeming rewards points for cash, etc. As another example, the screen shows the customer additional information about the ways in which the customer can earn rewards points, such as using a certain credit card for purchases which may provide a higher rate of rewards points than a debit card, etc. In some arrangements, the customer can be redirected to a particular merchant site to make a purchase using rewards points, etc.

The systems and methods described herein offer advantages for a customer having a rewards account with a provider. Many customers unknowingly allow their rewards balances to become stagnant, where rewards points may even expire without the customer redeeming them, causing the customer to have negative experiences with the rewards system. This, in turn, can decrease the customer's engagement with the customer's payment account, which is detrimental to the provider of the payment account. As such, generating notifications to customers with earning and burning opportunities based on their past engagement history may help customers to become more engaged with the rewards system. As a result, customers may have more positive experiences with the rewards system and remain longer, better customers of the provider. Furthermore, when the customers become more engaged with the rewards system, fewer and fewer reminders for earn and burn opportunities need to be generated and messaged to the customer, thereby reducing the necessary activity for the provider computing systems.

Referring to FIG. 1, a view of a rewards engagement system 100 is shown according to an example embodiment. Generally, the system 100 facilitates the promotion of a customer's engagement with a provided rewards account. The rewards engagement system 100 includes a customer device 112 and a provider computing system 118. In some arrangements, the rewards engagement system 100 also includes merchant points of purchase, such as the merchant POS terminal 114 and a merchant eCommerce host 116, where a customer can complete purchases to earn reward points and/or where a customer can make purchases using points (e.g., burn rewards points).

The rewards account of the customer is maintained by the provider. In some arrangements, the rewards account is associated with a payment account (e.g., a credit account, a line of credit, a demand deposit account, a prepaid account, etc.) maintained by the provider. In such arrangements, the customer may accrue points in the rewards account by paying for purchases from the payment account. For example, the payment account may be a credit account in which the customer earns a certain number of points for every dollar spent with the credit account (e.g., one point for one dollar, two points for one dollar, a certain percentage of the amount of purchases made, etc.). Through the system, the customer can pay for purchases with the payment account through any number of channels, including a payment card 108, a mobile wallet client 146 running on a mobile device (e.g., a smartphone) associated with the customer, or by providing payment account information to the merchant (e.g., via the payment card 108, via a customer device 112, by providing payment account information to a representative in person or over the phone, by entering payment account information into a website, etc.).

The provider (or provider computing system 118) can provide various versions of rewards. Examples of rewards include rewards points, cash rewards, travel or hotel rewards, gas rewards, and so on. Additionally, the customer redeems earned rewards for various rewards items. For example, in some embodiments, a customer redeems earned rewards by exchanging them for physical or digital goods or services. As an illustration, a customer redeems a certain number of rewards points for an airline ticket or a gift card. In other embodiments, a customer redeems earned rewards for cash or a cash balance. For example, a customer's rewards are reflected as a cashback bonus that the customer can apply as a statement credit, receive as a check, receive as a gift card, receive as cash, and so on.

Additionally, rewards are earned in different ways according to different embodiments. In one embodiment, spending a certain amount of money earns the customer a certain amount of rewards. For example, spending a dollar earns the customer one rewards point. As another example, spending a dollar earns the customer two cents in cashback rewards. In another embodiment, the customer earns more rewards by making certain purchases or by making purchases at certain retailers or businesses. In one example, the customer generally earns one rewards point per dollar spent on most goods and services but earns three points per dollar spent at gas stations. In another example, the customer earns 2% cashback on grocery purchases and 3% cashback on travel purchases. In some implementations, the customer earns additional rewards based on rotating categories. For example, in the first quarter, the customer earns 4% extra in cashback rewards on restaurant purchases, and the customer earns 4% extra in cashback rewards on gas purchases in the second quarter. In yet another embodiment, the customer alternatively or additionally earns rewards by performing certain actions. As an example, the customer earns an extra 1% in cashback rewards by paying off the customer's credit card balance in full by the customer's monthly payment deadline.

Still referring to FIG. 1, the customer device 112 includes a network interface 140 enabling the customer device 112 to exchange information over the network 122, an input/output circuit 142, a display 144, a mobile wallet client 146, and a client application 148. The network interface 140 is used to establish connections via the network 122 between the customer device 122 and other devices or computing systems. The network 122 further supports communication between the customer device 112 and other devices or computing systems. The customer device 112 also includes a processor and a memory similarly configured as that of the provider computing system 118 described below. The memory may include non-transitory storage mediums housing one or more logics that include instructions executable by the processor so as to configure the customer device 112 to exchange data over the network 122, execute software applications, access websites, generate graphical user interfaces, and perform other similar operations.

The input/output circuit 142 is structured to receive communications from and provide communications to the customer associated with the customer device 112. In this regard, the input/output circuit 142 is structured to exchange data, communications, instructions, etc. with an input/output component of the customer device 112. Accordingly, in one embodiment, the input/output circuit 142 includes an input/output device. In another embodiment, the input/output circuit 142 includes communication circuitry for facilitating the exchange of data, values, messages, and the like between an input/output device and the components of the customer device 112. In yet another embodiment, the input/output circuit 142 includes machine-readable media for facilitating the exchange of information between an input/output device and the components of the customer device 112. In still another embodiment, the input/output circuit 142 includes any combination of hardware components, communication circuitry, and machine-readable media.

In various embodiments, the display 144 is a screen, a touchscreen, etc. In some arrangements, the customer device 112 uses the display 144 to communicate information to the user, for example, by displaying information to the customer on the display 144. In some arrangements, the customer device 112 additionally uses the display 144 to receive communications from the user, for example, through a keyboard provided on a touchscreen of the display 144. Accordingly, in certain arrangements, the display 144 is incorporated as an input/output device associated with the input/output circuit 142.

The client application 148 is structured to provide displays to the customer device 112 that enable the customer to manage interactions with the rewards engagement system 100 and may be used to manage accounts held with the provider. Accordingly, the client application 148 is communicably coupled to the provider computing system 118 (e.g., the engagement rating circuit 130, messaging circuit 132, etc.). In some embodiments, the client application 148 may be incorporated with an existing application in use by the provider (e.g., a mobile banking application or a mobile wallet application). In other embodiments, the client application 148 is a separate software application implemented on the customer device 112. The client application 148 may be downloaded by the customer device 112 prior to its usage, hard coded into the memory of the customer device 112, or be a web-based interface application such that the customer device 112 may provide a web browser to the application, which may be executed remotely from the customer device 112. In the latter instance, the user may have to log onto or access the web-based interface before usage of the applications. Further, and in this regard, the client application 148 may be supported by a separate computing system including one or more servers, processors, network interface circuits, etc. that transmit applications for use to the customer device 112. In certain embodiments, the client application 148 includes an API and/or a software development kit (SDK) that facilitate the integration of other applications with the client application 148. For example, the client application 148 may include an API that facilitates the receipt of information pertaining to the rewards engagement system 100 as described further below.

The displays presented to the user via the client application 148 may be indicative of rewards engagement information, rewards earn opportunities, rewards burn opportunities, current account balances, pending transactions, profile information (e.g., contact information), and the like. The client application 148 may also provide a prompt to the customer to submit preferences to the system 100. For example, in some arrangements, the client application 148 may prompt the customer whether they desire to receive earn or burn opportunities, what types of earn or burn opportunities they would like to be informed of in the future, the types of channels through which they would like to receive messages from the system 100.

The payment card 108 is a physical card, such as a credit card, a debit card, a prepaid card, or the like. Accordingly, the payment card 108 can provide account information associated with the payment account (e.g., account number, expiration date, etc.) to a merchant point of sale ("POS") terminal 114 during a transaction between the merchant and the customer. The account information may be transmitted, for example, through an encoded magnetic stripe, an embedded smart chip (e.g., an EMV chip), through an embedded near-field communication ("NFC") tag, QR code, or the like. For example, the customer can swipe, insert, scan, or tap the payment card 108 at the merchant POS terminal 114 during an in-person transaction at a location of the merchant.

The mobile wallet client 146 is an application executed by a mobile device (e.g., a smartphone) associated with the customer. The mobile wallet client 146 is structured to provide payment account information to the merchant POS terminal 114 (e.g., by presenting a payment code on a display of the mobile device, by transmitting payment account information via a Bluetooth or NFC transmission, etc.). In some arrangements, the mobile wallet client 110 may be any of Apple® Pay, Android® Pay, Samsung® Pay, Wells Fargo® Wallet, or the like.

The customer can also provide the payment account information to an eCommerce host 116 associated with the merchant 104 during an online transaction. For example, the customer 102 can access the online shopping website associated with the merchant 104 via the customer computing device 112 and provide payment account information through a checkout feature of the online shopping web site. In some arrangements, the payment account information corresponds to an account number and expiration date printed or displayed on the payment card 108. The payment account information may, for example, be input into the customer computing device 112 by the customer 102 by typing the payment card information in or by transmitting the payment account information from the payment card 108 to the customer computing device 112. In an alternate arrangement, the payment account information can be provided via transmission from the mobile wallet client 110 to the eCommerce host 116. In a further arrangement, the payment account information can be provided over the phone to a representative of the merchant 104 and associated with a transaction facilitated with the eCommerce host 116.

Still referring to FIG. 1, the payment account is maintained by the provider. The provider may be, for example, a credit card issuer, a bank, or the like. The provider manages a provider computing system 118. The provider computing system 118 includes a network interface 120. The network interface 120 is used to establish connections with other computing systems by way of a network 122. The network 122 may include any combination of the internet, a private banking network, and the like. The network interface 120 includes program logic that facilitates connection of the financial institution computing system 118 to the network 122. For example, the network interface 120 may include any combination of a wireless network transceiver (e.g., a cellular modem, a Bluetooth transceiver, a WiFi transceiver, etc.) and/or a wired network transceiver (e.g., an Ethernet transceiver). In some arrangements, the network interface 120 includes the hardware and machine-readable media sufficient to support communication over multiple channels of data communication. Further, in some arrangements, the network interface 120 includes cryptography capabilities to establish a secure or relatively secure communication session in which data communicated over the session is encrypted.

The provider computing system 118 includes a processing circuit 124 having a processor 126 and memory 128. The processor 126 may be implemented as a general-purpose processor, an application specific integrated circuit (ASIC), one or more field programmable gate arrays (FPGAs), a digital signal processor (DSP), a group of processing components, or other suitable electronic processing components. The memory 128 includes one or more memory devices (e.g., RAM, NVRAM, ROM, Flash Memory, hard disk storage, etc.) that store data and/or computer code for facilitating the various processes described herein. Moreover, the memory 128 may be or include tangible, non-transient volatile memory or non-volatile memory.

The provider computing system 118 includes an engagement rating circuit 130 and a messaging circuit 132. Although FIG. 1 shows the engagement rating circuit 130 and the messaging circuit 132 as part of the processing circuit 124, in other arrangements one of or both of the engagement rating circuit 130 and/or the messaging circuit 132 are embodied as separate processing circuits. Other arrangements may include more or less circuits without departing from the spirit and scope of the present disclosure. Further, some arrangements may combine the activities of one circuit with another circuit to form a single circuit. Therefore, those of ordinary skill in the art will appreciate that the present arrangement is not meant to be limiting.

The engagement rating circuit 130 is configured to receive various customer rewards activity and customer payment card activity, analyze the nature of the activity in relation to the engagement of the customer with the rewards system 100, and generate a rewards engagement score or rating indicative of the customer's engagement with the rewards system 100. In some arrangements, the rewards activity information is received from the customer device 112 (e.g., through an online banking website, via the client application 148, via the mobile wallet client 146). Accordingly, the engagement rating circuit 130 is communicably and operatively coupled to the customer device 112.

The rewards activity information relates to the interactions the customer has with various aspects of the rewards system 100. For example, the customer may visit a website of the provider to access a rewards store where the customer views various items or services for which the customer can redeem rewards points. In some arrangements, rewards activity can also include, for example, the number of times a customer has visited a webpage to view reward travel options, the number of times the customer has redeemed rewards points for travel, etc.

In some arrangements, the payment card activity information is received from the customer device 112 (e.g., mobile wallet client 146, client application 148). In this case, the customer may have completed a purchase using the payment card 108 via the mobile wallet client 146 at a merchant POS terminal 114 or may have completed a purchase online at an eCommerce host 116 of a merchant. In some arrangements, the payment card activity information may also be received from the merchant as or immediately after the transaction between the customer and the merchant is completed.

The engagement rating circuit 130 analyzes the activity of the customer in relation to the rewards system. The engagement rating circuit 130 determines how the rewards and payment activity relate to the customer's engagement with the rewards system 100. The engagement rating circuit 130 can weigh specific rewards and/or payment card activity information depending on the activity's relation to an indication that the customer is engaged with the rewards account. For example, the engagement rating circuit 130 may weigh a trip purchase using rewards points higher than a redemption of points for cash. As another example, the engagement rating circuit 130 may weigh payment card activity information higher than rewards activity information, and so on.

Based on the analysis of the customer rewards and payment card activity, the engagement rating circuit 130 generates a rewards engagement score for each customer. The rewards engagement score is indicative of how engaged the customer is with the rewards account. For example, a higher rewards engagement score may be indicative of a highly engaged customer and a lower rewards engagement score may be indicative of a less engaged customer. The rewards engagement score may be made up of a series of metrics relating to both the reward activity and the payment card activity of the customer.

As an example, the rewards engagement score may range from 0-100 points, where half of the points (e.g., 50 points) are made up of metrics relating to the reward activity, such as frequency of rewards redemptions, frequency of rewards store visits, use of other provider products, and various program loyalty earn activity. The other half of the points (e.g., 50 points) are made up of metrics relative to the payment card activity, such as average point-of-sale spend during the past year, number of "everyday spend" categories (e.g., groceries, restaurants, gas, entertainment, etc.), digital wallet usage (e.g., usage of mobile wallet client 150), number of months with a minimum spend of $50, and so on.

The engagement rating circuit 130 is also configured to receive further interaction indications from the customer received at the customer device 112 and analyze the further interaction indications to generate an updated rewards engagement score. Further interaction indications may be the actions the customer takes in response to messages or notifications the system 100 sends to the customer. In some arrangements, the interaction indication is an interaction the customer had with the previously transmitted rewards engagement message. The interaction can include, but is not limited to, a dismissal of the message, clicking on a link in the message to view earn and burn opportunities, clicking on a link in the message to view an informational video, clicking on a link in the message to chat with a provider representative, etc. The engagement rating circuit 130 analyzes the activity and determines what type of interaction the customer had with the previously sent rewards engagement message.

Depending on the type of interaction, the rewards engagement score may go up or down. For example, if the customer interacted with the system to dismiss the previous rewards engagement message, the rewards engagement score will likely be a lower rewards engagement score than previously given to the customer due to the dismissal of the message. As another example, if the customer interacted with the system to click on a link in the message to view further information about how to earn or burn more rewards points, the rewards engagement score will likely be a higher rewards engagement score than previously given to the customer due to the customer's engagement with the system.

The messaging circuit 132 is configured to receive the rewards engagement score from the engagement rating circuit 130, determine the type of message to send to the customer, and transmit the message. Accordingly, the messaging circuit 132 is communicably and operatively to the engagement rating circuit 130 and the customer device 112. The messaging circuit 132 receives the rewards engagement score from the engagement rating circuit 130 and determines the type of message to send to the customer. In some arrangements, the messaging circuit 132 is also configured to receive an updated rewards engagement score from the engagement rating circuit 130 and determine the type of updated message to send to the customer. For example, the messaging circuit 132 may determine that the most effective message to the customer would be a banner displayed on a website of the provider, where for example, the customer views payment account and rewards account balances. The banner may prompt the customer to take an action relating to their rewards account. The banner may include a selectable link such that the customer can take various actions by selecting on the link in the banner, such as, making a purchase using rewards points at a merchant by clicking on the link displayed in the banner.

The rewards engagement message is transmitted to the customer in various ways. In some arrangements, the rewards engagement message can be transmitted to the customer as a push notification on the customer device 112. In some arrangements, the rewards engagement message can be transmitted to the customer as an advertisement provided on the client application 148. The way in which the message is transmitted to the customer can also be determined by the messaging circuit 132. The messaging circuit 132 can retrieve stored customer preferences, which may indicate through which channels the customer prefers to receive earn and burn opportunity messages. As such, the messaging circuit 132 is communicably and operatively coupled to the rewards account database 136. In some arrangements, the messaging circuit 132 transmits the rewards engagement message using the previous channel through which a message was sent. In this way, the messaging circuit 132 is targeting the message to the customer in a way that the customer has been prompted to interact with previously and as such, is likely to get the customer to interact with again.

The provider computing system 118 includes the accounts database 134. In some arrangements, the memory 128 includes the accounts database 134. In other arrangements, the accounts database 134 is a separate data storage device from the memory 128. The accounts database 134 is configured to retrievably hold, store, categorize, and otherwise serve as a repository for information associated with accounts (e.g., loan accounts, savings accounts, checking accounts, credit accounts, etc.) held by the provider. For example, the accounts database 134 may store account numbers, account balances, account ownership information, and the like. The accounts database 134 is structured to selectively provide access to information relating to an account at the provider.

The provider computing system 118 also includes the rewards database 136. In some arrangements, the memory 128 includes the rewards database 136. In other arrangements, the rewards database 136 is a separate data storage device from the memory 128. The rewards database 136 is configured to retrievably hold, store, categorize, and otherwise serve as a repository for information associated with rewards accounts held by various customers of the provider associated with the provider computing system 118. The information stored in the rewards database 136 includes, for example, rewards balances for various customer, what the customer can redeem rewards for, past rewards earn and burn activities, timing of past rewards earn and burn activities, potential opportunities for rewards earn and burn activities, and so on.

Figure 2:
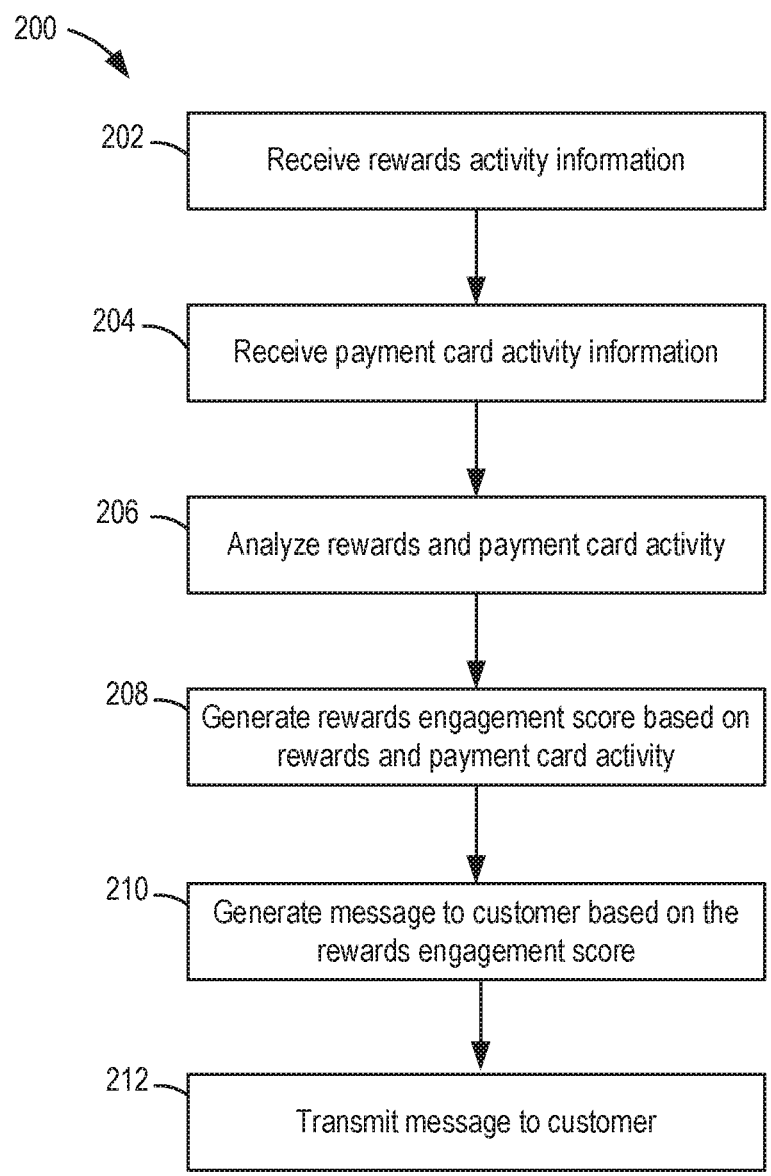
FIG. 2 is a view of a flow diagram of a method of engaging the customer through the rewards system according to an example embodiment.

Referring to FIG. 2, a flow diagram of a method 200 of engaging the customer through the rewards system is shown according to an example embodiment. The method 200 is performed by the provider computing system 118. Through the method 200, the provider computing system 118 generates a rewards engagement score or rating for customers and uses that rating to provide tailored earn and burn opportunities to the customers, thereby informing the customer the ways in which the customer can be more engaged with the rewards system 100.

The method 200 begins when rewards activity information is received at 202. The rewards activity information is received at the provider computing system 118. The rewards activity information may be received from the customer device 112 (e.g., through an online banking website, via the client application 148, via the mobile wallet client 146). The rewards activity information relates to the interactions the customer has with various aspects of the rewards system 100. For example, the customer may visit a website of the provider to access a rewards store where the customer views various items or services for which the customer can redeem rewards points. In some arrangements, rewards activity can also include, for example, the number of times a customer has visited a webpage to view reward travel options, the number of times the customer has redeemed rewards points for travel, etc.

Payment card activity is received at 204. The payment card activity is received at the provider computing system 118. In some arrangements, the payment card information is received from the customer device 112 (e.g., mobile wallet client 146, client application 148). In this case, the customer may have completed a purchase using the payment card 108 via the mobile wallet client 146 at a merchant POS terminal 114 or may have completed a purchase online at an eCommerce host 116 of a merchant. In some arrangements, the payment card information may also be received from the merchant as or immediately after the transaction between the customer and the merchant is completed.

The rewards and payment card activity information is analyzed at 206. In some arrangements, the reward and payment card activity information is analyzed by the engagement rating circuit 130 of the provider computing system 118. The engagement rating circuit 130, as noted above, analyzes the activity of the customer in relation to the rewards system. The engagement rating circuit 130 can weight specific rewards and/or payment card activity information depending on the activity's relation to an indication that the customer is engaged with the rewards account. For example, the engagement rating circuit 130 may weigh a trip purchase using rewards points higher than a redemption of points for cash. As another example, the engagement rating circuit 130 may weigh payment card activity information higher than rewards activity information, and so on.

A rewards engagement score is generated based on the rewards and payment card activity information at 208. In some arrangements, the rewards engagement score is generated by the engagement rating circuit 130 of the provider computing system 118. Based on the analysis performed at 206, the engagement rating circuit 130 generates a rewards engagement score for each customer. The rewards engagement score is indicative of how engaged the customer is with the rewards account. For example, a higher rewards engagement score may be indicative of a highly engaged customer and a lower rewards engagement score may be indicative of a less engaged customer.

A rewards engagement message is generated at 210. In some arrangements, the rewards engagement message is generated by the messaging circuit 132 of the provider computing system 118. The messaging circuit 132 receives the rewards engagement score from the engagement rating circuit 130 and determines the type of message to send to the customer. For example, the messaging circuit 132 may determine that the most effective message to the customer would be a banner displayed on a website of the provider, where for example, the customer views payment account and rewards account balances. The banner may prompt the customer to take an action relating to their rewards account. The banner may include a selectable link such that the customer can take various actions by selecting on the link in the banner, such as, making a purchase using rewards points at a merchant by clicking on the link displayed in the banner.

The rewards engagement message is transmitted to the customer at 212. The rewards engagement message is transmitted to the customer in various ways. In some arrangements, the rewards engagement message can be transmitted to the customer as a push notification on the customer device 112. In some arrangements, the rewards engagement message can be transmitted to the customer as an advertisement provided on the client application 148. The way in which the message is transmitted to the customer can also be determined by the messaging circuit 132. The messaging circuit 132 can retrieve stored customer preferences, which may indicate through which channels the customer prefers to receive earn and burn opportunity messages.

Figure 3:
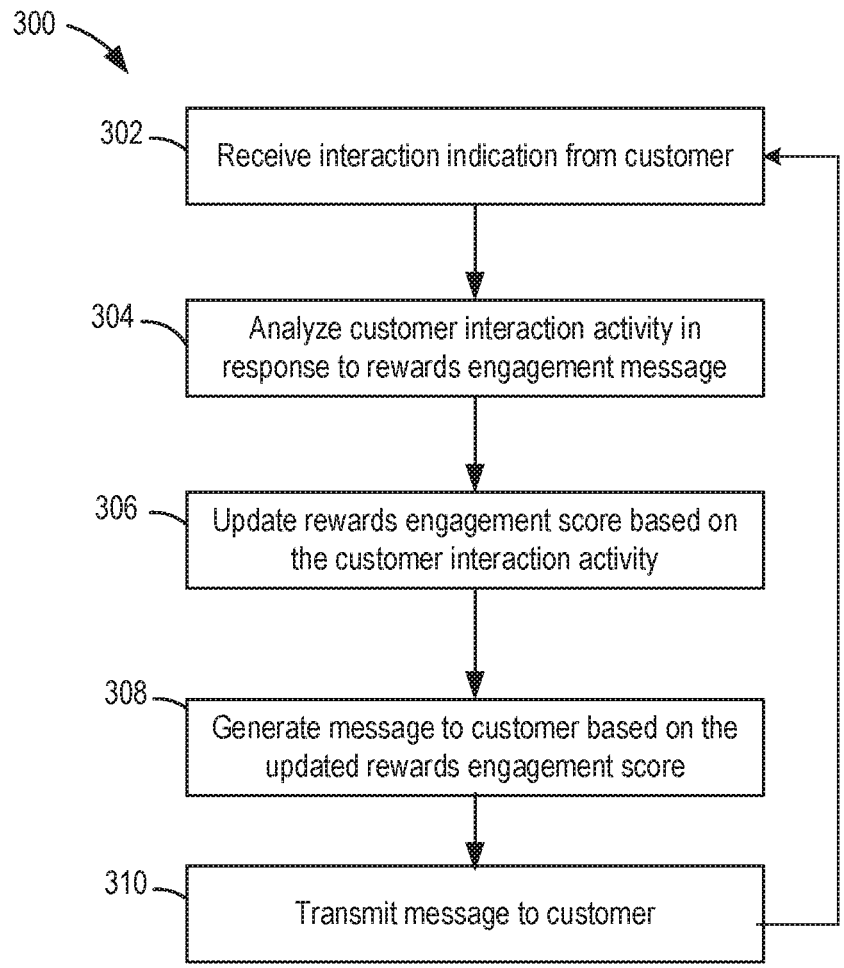
FIG. 3 is a view of a flow diagram of a method of engaging the customer through the rewards system according to an example embodiment.

Referring to FIG. 3, a flow diagram of a method 300 of engaging the customer through the rewards system is shown according to an example embodiment. The method 300 is performed by the provider computing system 118. Through the method 300, the provider computing system 118 continues to monitor the rewards and payment card activity of the customer and updates a rewards engagement score or rating for the customer.

The method 300 begins when an interaction indication is received from the customer at 302. The interaction indication is received by the provider computing system 118. The interaction indication is an interaction the customer had with the previously transmitted rewards engagement message (e.g., at step 212 above). The interaction can include, but is not limited to, a dismissal of the message, clicking on a link in the message to view earn and burn opportunities, redeeming rewards points for items or services, paying for merchandise or services with rewards points, clicking on a link in the message to view an informational video, clicking on a link in the message to chat with a provider representative, etc. In some arrangements, the interaction indication is received when the customer redeems the rewards points for items or services. In this case, the system 100 is also capable of debiting the corresponding amount of rewards points from the customer's rewards account balance. In some arrangements, the interaction indication is received when the customer makes a purchase using rewards points. In this case, the system 100 similarly debits the corresponding amount of rewards points from the customer's rewards account balance. In other arrangements, the interaction indication is received when the customer makes a purchase using their payment card 108 which earns the customer rewards points. In this case, the system 100 (e.g., provider computing system 118) is capable of crediting the corresponding amount of rewards points to the customer's rewards account balance.

Customer interaction activity is analyzed at 304. In some arrangements, the customer interaction activity information is analyzed by the engagement rating circuit 130 of the provider computing system 118. The engagement rating circuit 130, as noted above, analyzes the activity of the customer in relation to the rewards system. The engagement rating circuit 130 determines what type of interaction the customer had with the previously sent rewards engagement message. Depending on the type of interaction, the rewards engagement score may go up or down. The engagement rating circuit 130 takes into account the interaction activity received from the customer (e.g., from customer device 112).

For example, if the customer interacted with the system to dismiss the previous rewards engagement message, the rewards engagement score will likely be a lower rewards engagement score than previously given to the customer due to the dismissal of the message. As another example, if the customer interacted with the system to click on a link in the message to view a video about how to earn or burn more rewards points, the rewards engagement score will likely be a higher rewards engagement score than previously given to the customer due to the customer's engagement with the system via the informational video. A rewards engagement score is updated based on the customer interaction activity at 306. In some arrangements, the rewards engagement score is generated by the engagement rating circuit 130 of the provider computing system 118. Based on the analysis performed at 304, the engagement rating circuit 130 generates an updated rewards engagement score for the customer.

A rewards engagement message based on the customer interaction activity is generated at 308. In some arrangements, the rewards engagement message is generated by the messaging circuit 132 of the provider computing system 118. The messaging circuit 132 receives the updated rewards engagement score from the engagement rating circuit 130 and determines the type of updated message to send to the customer. The rewards engagement message is transmitted to the customer at 310. The messaging circuit 132 transmits the rewards engagement message to the customer. In some arrangements, the updated rewards engagement message is transmitted to the customer in various ways based on customer preferences stored in the rewards database 136. In some arrangements, the messaging circuit 132 transmits the rewards engagement message using the previous channel through which a message was sent. In this way, the messaging circuit 132 is targeting the message to the customer in a way that the customer has been prompted to interact with previously and as such, is likely to get the customer to interact with again. The method begins again at 302 to continuously monitor the customer interaction activity with the rewards engagement system 100.

Figure 4:
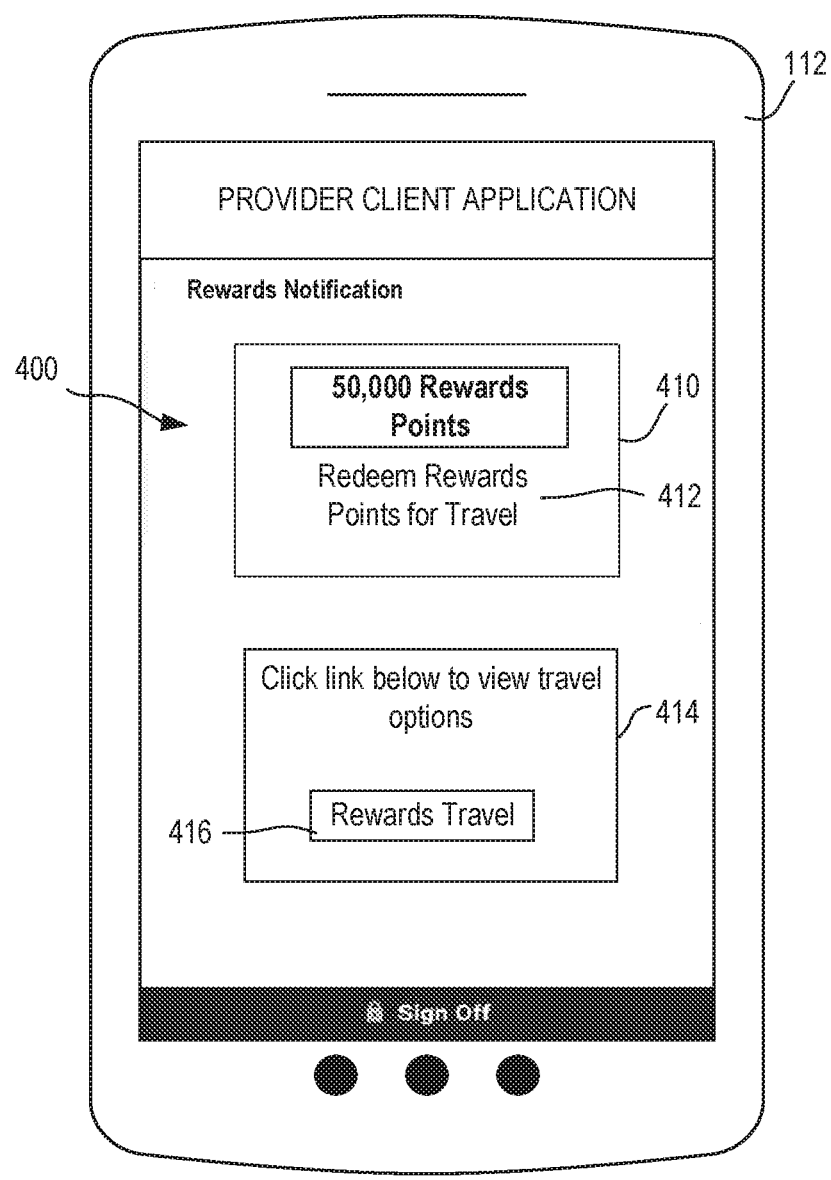
FIGS. 4 through 8 show various user interfaces of a customer device implementing the rewards engagement system as described in the method of FIGS. 2-3.
Figure 5:
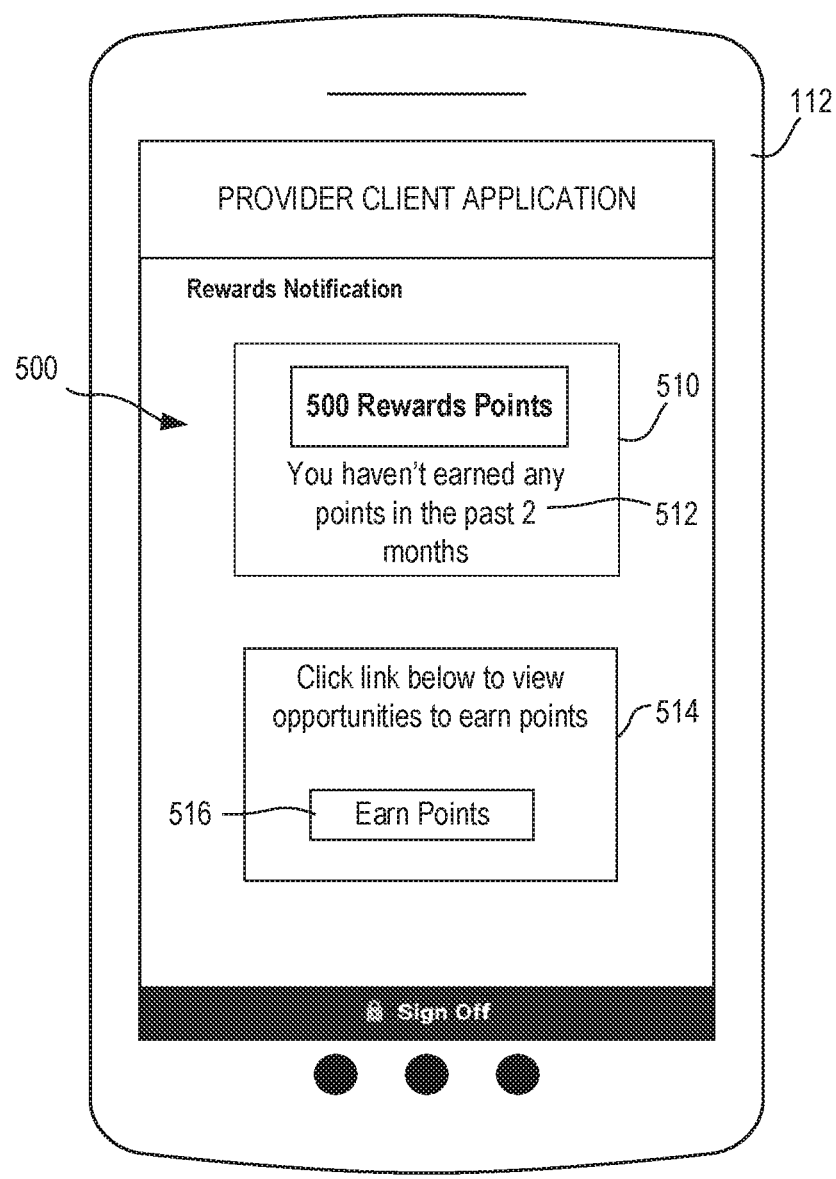
Figure 6:
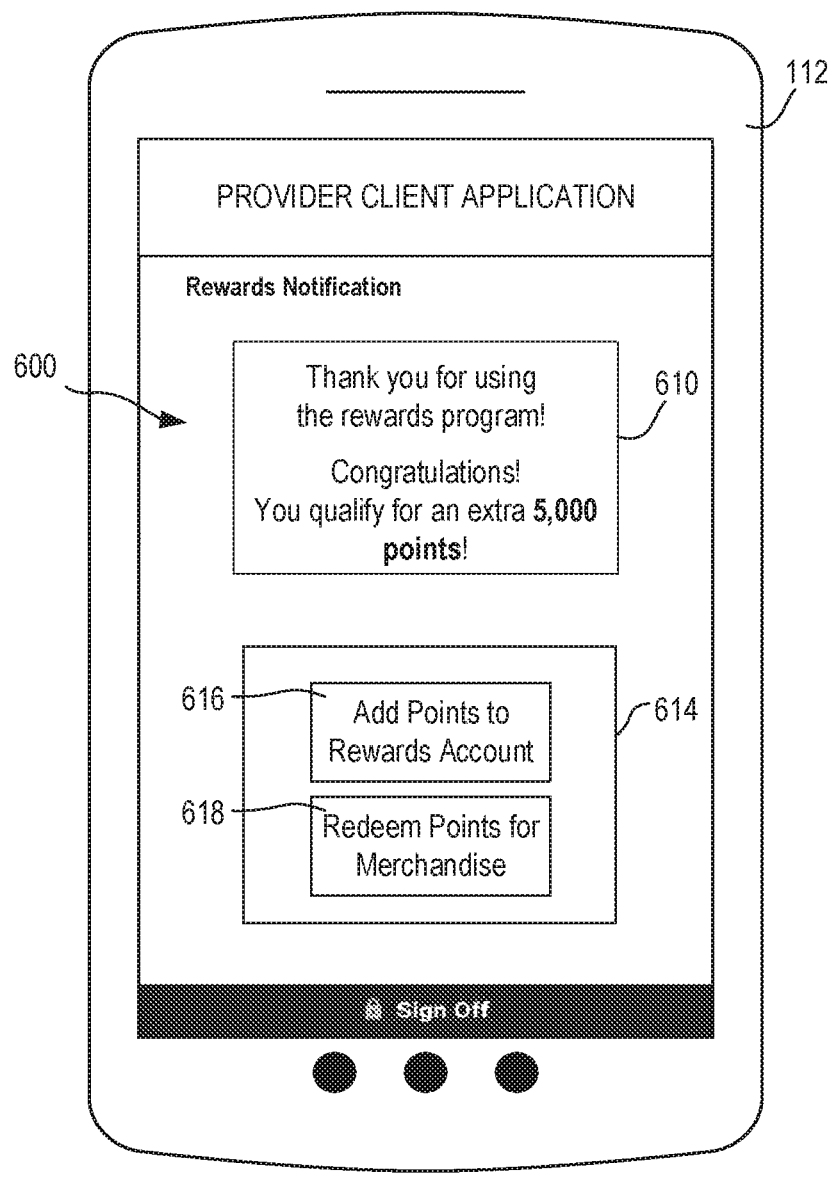

Referring to FIGS. 4-6, graphical user interfaces displayed on the customer device 112 via the client application 148 are shown, according to example embodiments. Referring now to FIG. 4, an example screenshot of a client application interface of the customer device 112 associated with a customer is shown, according to an example embodiment. The interface 400 is indicative of a rewards burn opportunities interface the customer could receive. The interface 400 includes a notification 410 notifying the customer that they currently have 50,000 rewards points available, a notification 412 that the customer can redeem rewards for travel, and a notification 414 that a link is provided that the customer can click to view rewards travel options. The interface 400 further includes one or more selections with which the customer can interact. For example, the selections can include a "Rewards Travel" selection 416 in the form of a link that the customer can click on to view rewards burn opportunities. In some embodiments, the customer receives the notification based on the system 100 determining that the customer has not burned rewards points in a certain amount of time, that the customer has enough points for a particular rewards purchase, or the like. The provider computing system 118 transmits the notification information to the customer device 112 (e.g., to the client application 148 running on the customer device 112, which displays the notification information to the customer as the interface 400).

Referring now to FIG. 5, an example screenshot of a client application interface of the customer device 112 associated with a customer is shown, according to an example embodiment. The interface 500 is indicative of a rewards earn opportunities interface the customer could receive. The interface 500 includes a notification 510 notifying the customer that they currently have 500 rewards points available, a notification 512 that the customer has not earned any points in the past two months, and a notification 514 prompting the customer to click on a link to view opportunities to earn rewards points. The interface 500 further includes one or more selections with which the customer can interact. For example, the selections can include an "Earn Points" selection 516 in the form of a link that the customer can click on to view opportunities to earn points and/or to view information on how to earn rewards points. In some embodiments, the customer receives the notification based on the system 100 determining that the customer has not earned rewards points in a certain amount of time, etc. The provider computing system 118 transmits the notification information to the customer device 112 (e.g., to the client application 148 running on the customer device 112, which displays the notification information to the customer as the interface 500).

Referring now to FIG. 6, an example screenshot of a client application interface of the customer device 112 associated with a customer is shown, according to an example embodiment. The interface 600 is indicative of a rewards incentive interface the customer could receive. The interface 600 includes a notification 610 notifying the customer that they have been selected to receive 5,000 points based on their engagement with the rewards system, a notification 614 prompting the customer to click on a link to either add the points to their balance or redeem the points for merchandise. The interface 500 further includes one or more selections with which the customer can interact. For example, the selections can include an "Add Points to Rewards Account" selection 616 in the form of a link that the customer can click on to add the points to their rewards account, and a "Redeem Points for Merchandise" selection 618 in the form of a link that the customer can click on to view merchandise to purchase using redeemed rewards points. In some embodiments, the customer receives the notification based on the system 100 determining that the customer has been highly engaged with the rewards system over a period of time, etc. The provider computing system 118 transmits the notification information to the customer device 112 (e.g., to the client application 148 running on the customer device 112, which displays the notification information to the customer as the interface 600).

However, it should be understood that the interfaces and notifications shown in FIGS. 4-6 are examples and that other notifications transmitted by the provider computing system 118 are contemplated by this disclosure. For example, in various arrangements, the provider computing system 118 instead transmits an email to the customer or a text message to the customer device 112. Furthermore, in other embodiments, the notification includes different or additional information. As an example, the notification includes information on the customer's total rewards balance, other ads for items that the customer can redeem the rewards balance for (e.g., determined based on the customer's rewards redemption history, determined based on the redemption histories of other customers similar to the customer), and so on.

Figure 7:
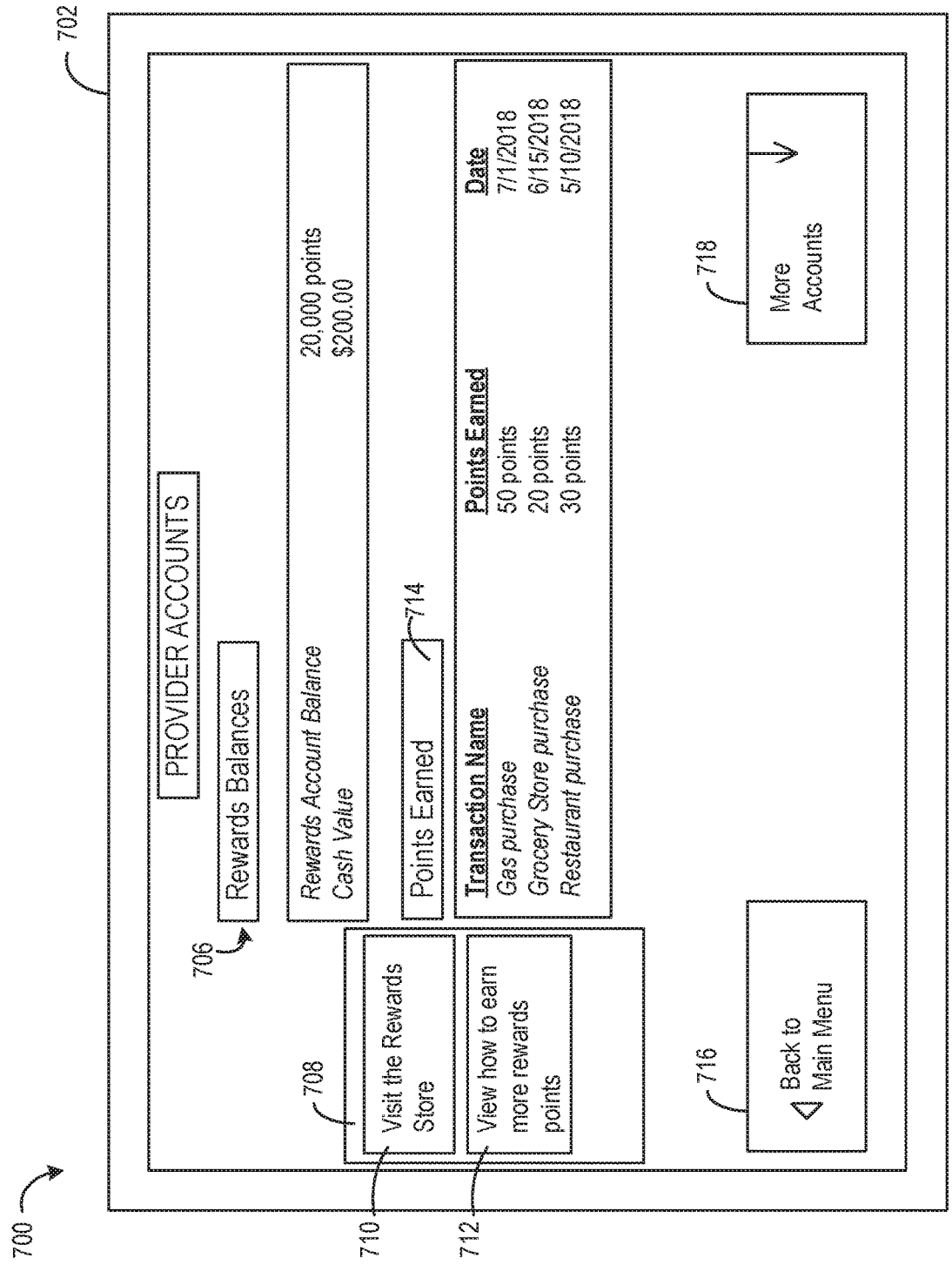
Figure 8:
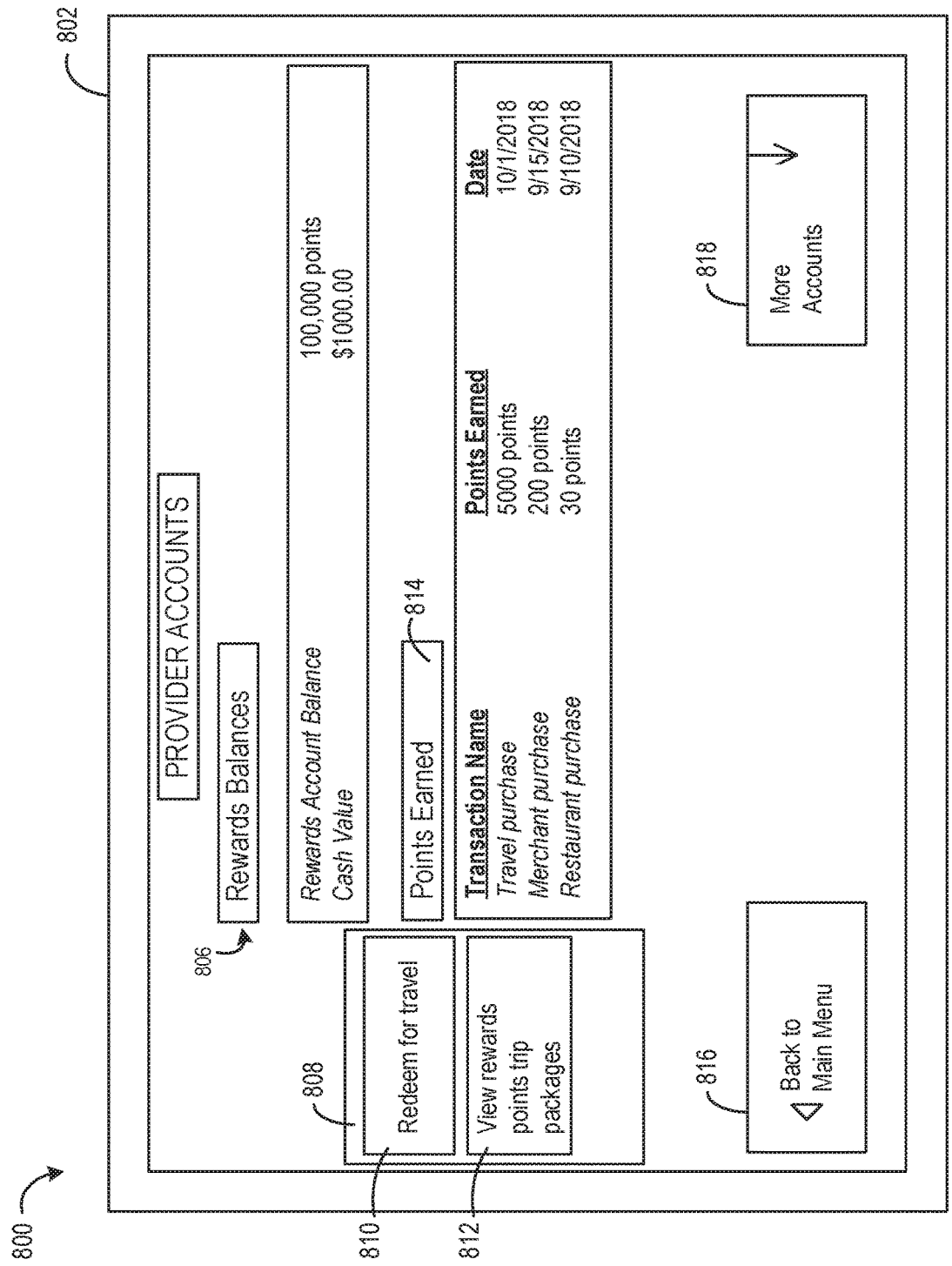

Referring to FIGS. 7-8, graphical user interfaces displayed on the customer device 112 via a provider portal are shown, according to example embodiments. More specifically, FIGS. 7-8 depict example screenshots on the display 144 of the customer device 112 including rewards banners generated based on the customer's rewards system engagement. To begin with, FIG. 7 shows a website interface 700. Website interface 700 may be indicative of a display generated based on information that the customer has not earned rewards point in a certain period of time such that rewards earning opportunities are presented. The website interface 700 includes rewards account information 702 for the customer, for example, showing the customer's accounts and the balance in each of the accounts. The information 702 includes rewards balance 706, including the rewards account balance and corresponding cash value, and points earned information 714, including transaction names, respective points earned, and dates. The website interface 700 also includes a rewards banner 708, which indicates that the customer can select options 710 or 712 on the banner 708 to either visit the rewards store or view how to earn more rewards points. In various embodiments, in response to selecting an option 710, 712 on the rewards banner 708, a rewards functionality is activated. Accordingly, the customer is redirected to another screen allowing the customer to view rewards merchandise, rewards information, etc. The customer can also selection back to main menu option 716 and more accounts option 718.

Referring to FIG. 8, the website interface 800 includes rewards account information 802 for the customer, for example, showing the customer's accounts and the balance in each of the accounts. Website interface 800 may be indicative of a display generated based on information that the customer has not redeemed their rewards points in a certain period of time such that rewards burning opportunities are presented. The information 802 includes rewards balance 806, including the rewards account balance and corresponding cash value, and points earned information

814, including transaction names, respective points earned, and dates. The website interface 800 also includes a rewards banner 708, which indicates that the customer can select options 810 or 812 on the banner 808 to either redeem points for travel or view rewards trip packages. In various embodiments, in response to selecting an option 810, 812 on the rewards banner 808, a rewards functionality is activated. Accordingly, the customer is redirected to another screen allowing the customer to view rewards merchandise, rewards information, etc. The customer can also selection back to main menu option 816 and more accounts option 818.

Furthermore, those of skill in the art will appreciate that FIGS. 7-8 are meant to be illustrative, rather than limiting. For example, in other embodiments, the interfaces are configured differently, such as including a different number, order, or type of rewards services selections. As another example, in other embodiments, the rewards banner is displayed differently, such as displayed as a pop-up notification triggered, for example, when the customer selects a selection redirecting the customer to view account balances or rewards information.

The arrangements described herein have been described with reference to drawings. The drawings illustrate certain details of specific arrangements that implement the systems, methods and programs described herein. However, describing the arrangements with drawings should not be construed as imposing on the disclosure any limitations that may be present in the drawings.

It should be understood that no claim element herein is to be construed under the provisions of 35 U.S.C. § 112(f), unless the element is expressly recited using the phrase "means for."

As used herein, the term "circuit" may include hardware structured to execute the functions described herein. In some arrangements, each respective "circuit" may include machine-readable media for configuring the hardware to execute the functions described herein. The circuit may be embodied as one or more circuitry components including, but not limited to, processing circuitry, network interfaces, peripheral devices, input devices, output devices, sensors, etc. In some arrangements, a circuit may take the form of one or more analog circuits, electronic circuits (e.g., integrated circuits (IC), discrete circuits, system on a chip (SOCs) circuits, etc.), telecommunication circuits, hybrid circuits, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on).

The "circuit" may also include one or more processors communicatively coupled to one or more memory or memory devices. In this regard, the one or more processors may execute instructions stored in the memory or may execute instructions otherwise accessible to the one or more processors. In some arrangements, the one or more processors may be embodied in various ways. The one or more processors may be constructed in a manner sufficient to perform at least the operations described herein. In some arrangements, the one or more processors may be shared by multiple circuits (e.g., circuit A and circuit B may comprise or otherwise share the same processor which, in some example arrangements, may execute instructions stored, or otherwise accessed, via different areas of memory). Alternatively, or additionally, the one or more processors may be structured to perform or otherwise execute certain operations independent of one or more co-processors. In other example arrangements, two or more processors may be coupled via a bus to enable independent, parallel, pipelined, or multi-threaded instruction execution. Each processor may be implemented as one or more general-purpose processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor, etc.), microprocessor, etc. In some arrangements, the one or more processors may be external to the apparatus, for example the one or more processors may be a remote processor (e.g., a cloud based processor). Alternatively, or additionally, the one or more processors may be internal and/or local to the apparatus. In this regard, a given circuit or components thereof may be disposed locally (e.g., as part of a local server, a local computing system, etc.) or remotely (e.g., as part of a remote server such as a cloud based server). To that end, a "circuit" as described herein may include components that are distributed across one or more locations.

An exemplary system for implementing the overall system or portions of the arrangements might include a general purpose computing computers in the form of computers, including a processing unit, a system memory, and a system bus that couples various system components including the system memory to the processing unit. Each memory device may include non-transient volatile storage media, non-volatile storage media, non-transitory storage media (e.g., one or more volatile and/or non-volatile memories), etc. In some arrangements, the non-volatile media may take the form of ROM, flash memory (e.g., flash memory such as NAND, 3D NAND, NOR, 3D NOR, etc.), EEPROM, MRAM, magnetic storage, hard discs, optical discs, etc. In other arrangements, the volatile storage media may take the form of RAM, TRAM, ZRAM, etc. Combinations of the above are also included within the scope of machine-readable media. In this regard, machine-executable instructions comprise, for example, instructions and data which cause a general purpose computer, special purpose computer, or special purpose processing machines to perform a certain function or group of functions. Each respective memory device may be operable to maintain or otherwise store information relating to the operations performed by one or more associated circuits, including processor instructions and related data (e.g., database components, object code components, script components, etc.), in accordance with the example arrangements described herein.

It should also be noted that the term "input devices," as described herein, may include any type of input device including, but not limited to, a keyboard, a keypad, a mouse, joystick or other input devices performing a similar function. Comparatively, the term "output device," as described herein, may include any type of output device including, but not limited to, a computer monitor, printer, facsimile machine, or other output devices performing a similar function.

Any foregoing references to currency or funds are intended to include fiat currencies, non-fiat currencies (e.g., precious metals), and math-based currencies (often referred to as cryptocurrencies). Examples of math-based currencies include Bitcoin, Litecoin, Dogecoin, and the like.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative arrangements. Accordingly, all such modifications are intended to be included within the scope of the present disclosure as defined in the appended claims. Such variations will depend on the machine-readable media and hardware systems chosen and on designer choice. It is understood that all such variations are within the scope of the disclosure. Likewise, software and web implementations of the present disclosure could be accomplished with standard programming techniques with rule based logic and other logic to accomplish the various database searching steps, correlation steps, comparison steps and decision steps.

The foregoing description of arrangements has been presented for purposes of illustration and description. It is not intended to be exhaustive or to limit the disclosure to the precise form disclosed, and modifications and variations are possible in light of the above teachings or may be acquired from this disclosure. The arrangements were chosen and described in order to explain the principals of the disclosure and its practical application to enable one skilled in the art to utilize the various arrangements and with various modifications as are suited to the particular use contemplated. Other substitutions, modifications, changes and omissions may be made in the design, operating conditions and arrangement of the arrangements without departing from the scope of the present disclosure as expressed in the appended claims.

What is claimed is:

1. A method comprising:
    establishing, by a provider computing system, an application programming interface with a client application installed on a user device to enable communication between the provider computing system and the client application;
    receiving, by the provider computing system, from the client application via the application programming interface, rewards activity information associated with a rewards account associated with the user device and maintained by the provider computing system;
    receiving, by the provider computing system, from the client application or from a merchant device, payment card information transmitted by the client application to the merchant device, the payment card information associated with a payment account associated with a user of the user device;
    generating, by the provider computing system, a first rewards engagement score for the rewards account based on the rewards activity information and the payment card information;
    transmitting, by the provider computing system, a first push notification to the client application via the application programming interface, the first push notification comprising a first rewards engagement message for display in a first graphical user interface of the client application, the first rewards engagement message based on the first rewards engagement score;
    receiving, by the provider computing system, from the client application via the application programming interface, a first interaction indication corresponding to a first interaction with the first graphical user interface;
    determining, by the provider computing system, from the first interaction indication, that the first interaction is a dismissal of the first rewards engagement message displayed on the first graphical user interface of the client application;
    generating, by the provider computing system, a second rewards engagement score for the rewards account based on the dismissal of the first rewards engagement message;
    transmitting, by the provider computing system, a second push notification to the client application via the application programming interface, the second push notification comprising a second rewards engagement message for display in a second graphical user interface of the client application, the second rewards engagement message based on the second rewards engagement score;
    receiving, by the provider computing system, from the client application via the application programming interface, a second interaction indication corresponding to a second interaction with the second graphical user interface;
    determining, by the provider computing system, from the second interaction indication, that the second interaction was a click of a link in the second rewards engagement message;
    generating, by the provider computing system, a third rewards engagement score for the rewards account based on the click of the link;
    transmitting, by the provider computing system, a third push notification to the client application via the application programming interface, the third push notification comprising a third rewards engagement message for display in a third graphical user interface, the third rewards engagement message based on the third rewards engagement score;
    assigning, by the provider computing system, redemption points to the rewards account based on the third rewards engagement score;
    determining, by the provider computing system, based on information received from the merchant device, that the redemption points were not redeemed within a predetermined amount of time; and
    transmitting, by the provider computing system, via the application programming interface, redemption information for display in a fourth graphical user interface of the client application to indicate that the redemption points assigned to the rewards account were not redeemed.

2. The method of claim 1, further comprising:
    receiving, by the provider computing system, a rewards redemption indication from the user device in response to the third rewards engagement message; and
    debiting, by the provider computing system, the redemption points from the rewards account maintained by the provider computing system and associated with the user device.

3. The method of claim 1, further comprising:
    receiving, by the provider computing system, a payment card indication from the user device in response to the third rewards engagement message, the payment card indication relating to a purchase made by the user device using a payment card associated with the rewards account; and crediting, by the provider computing system, an amount of the redemption points to the rewards account maintained by the provider computing system and associated with the user device.

4. The method of claim 1, wherein the second rewards engagement score is lower than the first rewards engagement score.

5. The method of claim 1, wherein the second interaction indication is a rewards points redemption and the third rewards engagement score is higher than the second rewards engagement score.

6. The method of claim 1, wherein the third rewards engagement message includes an indication of incentive rewards points added to the rewards account in response to the second interaction indication.

7. The method of claim 1, wherein the first, second, or third rewards engagement message is transmitted as a banner on a website portal of the provider computing system, an email, or a text message.

8. The method of claim 1, wherein the first, second, or third rewards engagement message includes an advertisement for the user device to engage in a rewards points earning activity.

9. The method of claim 1, wherein the first, second, or third rewards engagement message includes an advertisement for the user device to engage in a rewards points burning activity.

10. A provider computing system associated with a provider, the provider computing system comprising:

a network interface structured to facilitate data communication via a network;

an accounts database structured to store information associated with a payment account associated with a user device;

a rewards database structured to store information associated with a rewards account associated with the user device;

a processing circuit comprising a processor and memory, the processing circuit structured to:

establish an application programming interface with a client application installed on the user device to enable communication between the provider computing system and the client application;

receive, from the client application via the application programming interface, rewards activity information associated with the rewards account associated with the user device and maintained by the provider;

receive, from the client application or from a merchant device, payment card information transmitted by the client application to the merchant device, the payment card information associated with the payment account associated with a user of the user device;

generate a first rewards engagement score for the rewards account based on the rewards activity information and the payment card information;

transmit a first push notification to the client application via the application programming interface, the first push notification comprising a first rewards engagement message for display in a first graphical user interface of the client application, the first rewards engagement message based on the first rewards engagement score;

receive from the user device from the client application via the application programming interface, a first interaction indication corresponding to a first interaction with the first graphical user interface;

determine, from the first interaction indication, that the first interaction is a dismissal of the first rewards engagement message displayed on the first graphical user interface of the client application;

generate, a second rewards engagement score for the rewards account based on the dismissal of the first rewards engagement message;

transmit, a second push notification to the client application via the application programming interface, the second push notification comprising a second rewards engagement message for display in a second graphical user interface of the client application, the second rewards engagement message based on the second rewards engagement score;

receive, from the client application via the application programming interface, a second interaction indication corresponding to a second interaction with the second graphical user interface;

determine from the second interaction indication, that the second interaction was a click of a link in the second rewards engagement message;

generate a third rewards engagement score for the rewards account based on the click of the link;

transmit the a third push notification to the client application via the application programming interface, the third push notification comprising a third rewards engagement message for display in a third graphical user interface, the third rewards engagement message based on the third rewards engagement score;

assign redemption points to the rewards account based on the third rewards engagement score;

determine, based on information received from the merchant device, that the redemption points were not redeemed within a predetermined amount of time; and transmit, via the application programming interface, redemption information for display in a fourth graphical user interface of the client application to indicate that the redemption points assigned to the rewards account were not redeemed.

11. The provider computing system of claim 10, wherein the processing circuit is further configured to:

receive a rewards redemption indication from the user device in response to the third rewards engagement message; and debit the redemption points from the rewards account maintained by the provider and associated with the user device.

12. The provider computing system of claim 10, wherein the processing circuit is further configured to:

receive a payment card indication from the user device in response to the third rewards engagement message, the payment card indication relating to a purchase made by the user device using payment card associated with the rewards account; and credit the redemption points to the rewards account maintained by the provider and associated with the user device.

13. The provider computing system of claim 10, wherein the second rewards engagement score is lower than the first rewards engagement score.

14. The provider computing system of claim 10, wherein the second interaction indication is a rewards points redemption and the third rewards engagement score is higher than the second rewards engagement score.

15. The provider computing system of claim 10, wherein the third rewards engagement message is transmitted as a banner on a website portal of the provider, an email, or a text message.

16. The provider computing system of claim 10, wherein the first,
second, or third rewards engagement message includes an advertisement for the user device to engage in a rewards points earning activity.

17. The provider computing system of claim 10, wherein the first,
second, or third rewards engagement message includes an advertisement for the user device to engage in a rewards points burning activity.

18. A user device comprising:
a network circuit structured to communicate data to and from an application programming interface of a provider computing system associated with a provider of a rewards account associated with the user device and maintained by the provider computing system;
an input/output device structured to exchange data with the user device;
a client application installed on the user device; and
a processing circuit comprising a processor and memory, the processing circuit structured to:
transmit, via the network circuit to the provider computing system, payment card information associated with a payment account associated with a user of the user device;
transmit, via the network circuit to the provider computing system, rewards activity information associated with the rewards account;
receive, via the network circuit, for display by the client application, a first push notification for display in a first graphical user interface of the client application, the first push notification comprising a first rewards engagement message generated by the provider computing system based on the rewards activity information and the payment card information, the first graphical user interface enabling the user device to receive, via the input/output device, selections or dismissals of the first rewards engagement message;
receive a first input from the user device via the input/output device, the first input indicating a dismissal of the first rewards engagement message;
transmit, via the network circuit, a first indication of the dismissal, to the provider computing system; and
receive, via the network circuit, a second push notification for display in a second graphical user interface of the client application, the second push notification comprising a second rewards engagement message to indicate a change in the rewards account, the second graphical user interface enabling the user device to receive, via the input/output device, selections or dismissals of the second rewards engagement message;
receive a second input from the user device via the input/output device, the second input indicating a selection of the second rewards engagement message;
transmit, via the network circuit, a second indication of the selection, to the provider computing system;
receive a third push notification comprising a third rewards engagement message for display in a third graphical user interface of the client application, the third rewards engagement message indicating redemption points assigned to the rewards account based on the selection; and
receive, via the network circuit, redemption information for display in a fourth graphical user interface of the client application, the redemption information indicating that the redemption points assigned to the rewards account were not redeemed.

19. The user device of claim 18, wherein the processing circuit is further configured to:
receive a rewards redemption from the input/output device in response to the third rewards engagement message; and
transmit the rewards redemption to the provider computing system.

20. The user device of claim 18, wherein the processing circuit is further configured to:
receive a payment card from the input/output device in response to the first, second, or third rewards engagement messages, the payment card relating to a purchase made by the user device using the payment card associated with the one or more rewards accounts; and
transmit the payment card to the provider computing system.

21. The user device of claim 18, wherein the first, second, or third rewards engagement messages are received and displayed as a banner on a website portal of the provider, an email, or a text message.

22. The user device of claim 18, wherein first, second, or third rewards engagement messages include an advertisement for the user device to engage in a rewards points earning activity.

23. The user device of claim 18, wherein the first, second, or third rewards engagement messages include an advertisement for the user device to engage in a rewards points burning activity.

* * * * *